United States Patent [19]

Ushida et al.

[11] 4,404,341

[45] Sep. 13, 1983

[54] PROCESS FOR PRODUCING OLEFIN POLYMERS OR COPOLYMERS AND CATALYST THEREFOR

[75] Inventors: Yoshihisa Ushida, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 118,325

[22] Filed: Feb. 4, 1980

[30] Foreign Application Priority Data

Feb. 6, 1979 [JP] Japan .................................. 54-11823

[51] Int. Cl.$^3$ .......................... C08F 4/64; C08F 10/04
[52] U.S. Cl. ................... 526/125; 252/429 B; 526/124; 526/351; 526/905; 526/906
[58] Field of Search ............... 252/429 B; 526/124, 526/125

[56] References Cited

U.S. PATENT DOCUMENTS

| | | | |
|---|---|---|---|
| 4,069,169 | 1/1978 | Toyoda et al. | 526/125 |
| 4,130,503 | 12/1978 | Fodor | 526/125 |
| 4,180,636 | 12/1979 | Hirota et al. | 526/125 |
| 4,187,196 | 2/1980 | Giannini et al. | 526/125 |
| 4,229,558 | 10/1980 | Kakogawa et al. | 526/125 |

*Primary Examiner*—Edward J. Smith
*Attorney, Agent, or Firm*—Sherman & Shalloway

[57] ABSTRACT

In a process for producing an olefin polymer or copolymer by polymerizing an alpha-olefin having at least 3 carbon atoms or copolymerizing such alpha-olefins with each other or such an alpha-olefin with up to 20 mole % of ethylene and/or a diene in the presence of a catalyst comprising (1) a solid titanium catalyst component having magnesium, halogen, titanium, phosphorus and a carboxylic acid ester and (2) an organometallic compound of a metal of Groups I to III of the Mendelejeff's periodic table; the improvement wherein said catalyst is composed of (A) the solid titanium catalyst component (1) in which the molar ratio of the phosphorus to the carboxylic acid ester is from about 0.05 to about 2 and which has a specific surface area of not less than about 40 m$^2$/g, (B) the organometallic compound (2), and (C) an electron donor; and a catalyst used for aforesaid process.

6 Claims, 2 Drawing Figures

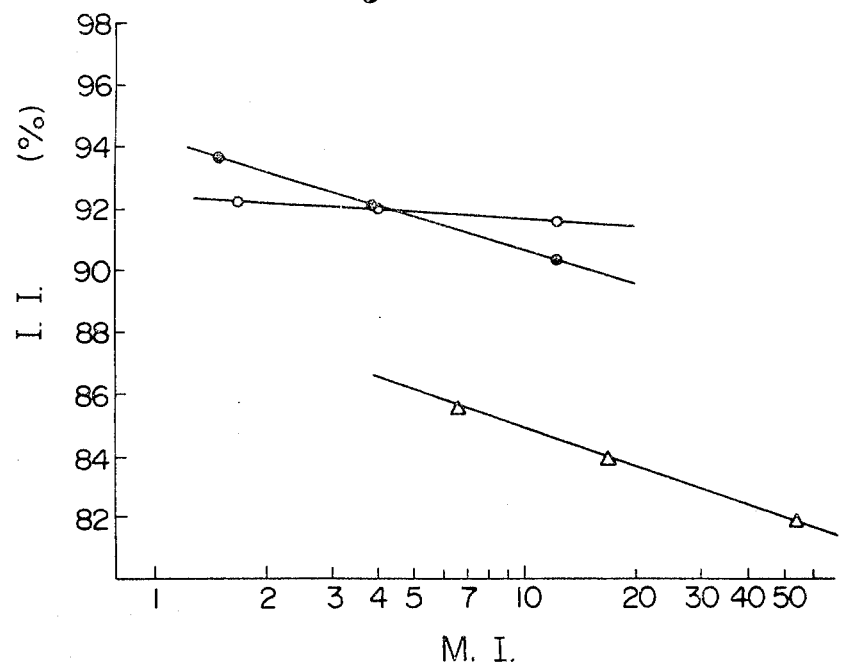
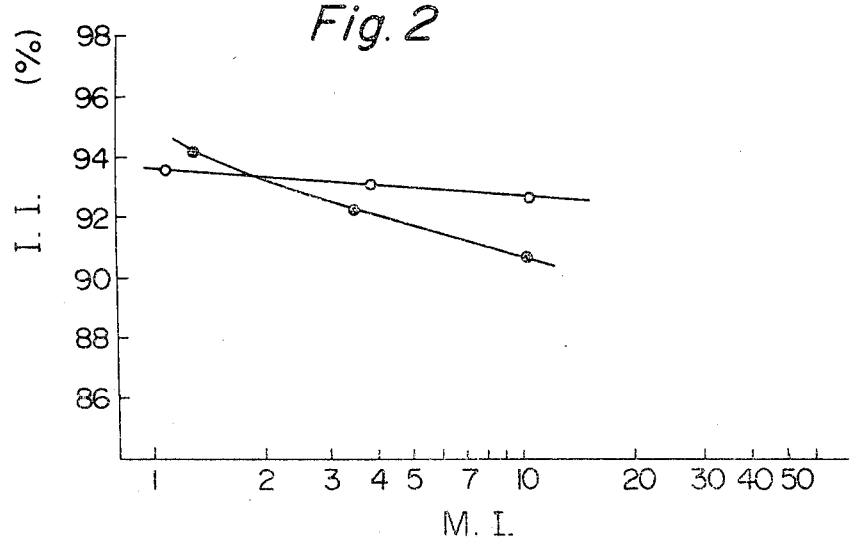

PROCESS FOR PRODUCING OLEFIN POLYMERS OR COPOLYMERS AND CATALYST THEREFOR

This invention relates to a process for producing highly stereoregular polymers or copolymers of alpha-olefins with at least 3 carbon atoms in high yields. Particularly, it relates to a process for producing such polymers and copolymers, in which even when the melt flow indices (MI) of the resulting polymers or copolymers are varied by using a molecular weight controlling agent such as hydrogen, their stereoregularity scarcely changes; and to a catalyst used in the aforesaid process.

More specifically, this invention relates to a process for producing an olefin polymer or copolymer by polymerizing an alpha-olefin having at least 3 carbon atoms or copolymerizing such alpha-olefins with each other or such an alpha-olefin with up to 20 mole percent of ethylene and/or a diene in the presence of a catalyst comprising (1) a solid titanium catalyst component having magnesium, halogen, titanium, phosphorus and a carboxylic acid ester and (2) an organometallic compound of a metal of Groups I to III of the Mendelejeff's periodic table; characterized in that said catalyst is composed of (A) said titanium catalyst component (1) in which the mole ratio of the phosphorus to the carboxylic acid ester is from about 0.05 to about 2 and which has a specific surface area of not less than about 40 m²/g, (B) said organometallic compound (2), and (C) an electron donor.

This invention also relates to the aforesaid catalyst, and a process for preparation thereof.

Numerous methods have been proposed heretofore for the high-activity polymerization of copolymerization of olefins using a solid titanium catalyst component having magnesium, halogen and titanium obtained by supporting a titanium compound on a halogen-containing magnesium compound, and the omission of a step of removing the catalyst residue from the polymers or copolymers has been suggested therein. When such a catalyst component is used in the polymerization or copolymerization of alpha-olefins having at least 3 carbon atoms, the resulting polymers or copolymers frequently have very low stereoregularity, in which case such a method cannot be commercially advantageous in the production of crystalline polymers or copolymers.

It was found that a solid titanium catalyst component having a carboxylic acid ester in addition to the aforesaid magnesium, halogen and titanium is suitable for the highly stereoregular polymerization of alpha-olefins having at least 3 carbon atoms, especially propylene, and many processes for preparing such a catalyst and many processes for polymerizing or copolymerizing olefins using such a catalyst have been suggested. The use of such a titanium catalyst component, however, is not entirely advantageous. For example, when the polymerization or copolymerization of propylene is carried out in the presence of a molecular weight controlling agent such as hydrogen in an attempt to increase the melt flow index of a propylene polymer or copolymer, the stereoregularity of the polymer or copolymer undesirably decreases, and the yield of the polymer or copolymer based on monomer cannot be increased.

An attempt to overcome such disadvantages is disclosed in Japanese Laid-Open Patent Publication No. 1276/78 (published on Jan. 9, 1978). This Laid-Open Patent Publication discloses the polymerization of olefins in the presence of a catalyst comprising a solid titanium catalyst component having magnesium, halogen, titanium and phosphorus, a trialkyl aluminium compound and a carboxylic acid ester, said titanium catalyst component being obtained by contacting a copulverized product of a magnesium dihalide and an acyl halide such as benzoyl chloride, benzoyl bromide, trichloroacetyl chloride, p-chlorobenzoyl chloride or p-methoxybenzoyl chloride with a mixture or addition reaction product of a tetravalent titanium compound containing at least one halogen atom and an organophosphorus compound having a P—O bond. This Laid-Open Patent Publication shows a comparative experiment in which a solid titanium catalyst component having magnesium, halogen, titanium, phosphorus and a carboxylic acid ester prepared in the aforesaid manner except that methyl benzoate is used instead of the acyl halide gave an unsatisfactory result. In this comparative experiment, 49.5 g of triphenyl phosphate and 3.46 g of methyl benzoate is used, and the mole ratio of the phosphorus to the carboxylic acid ester is about 6.0. As shown in Comparative Examples 12 and 13 given hereinbelow in the present specification, the mole ratio of the phosphorus to the carboxylic acid ester in the resulting solid titanium catalyst component is about 0.57, but its specific surface area is as low as 5.6 m²/g. If it is attempted to increase the melt flow index of the resulting polymer by performing the polymerization in the presence of the aforesaid solid titanium catalyst component, the stereoregularity of the polymer necessarily decreases. The above suggested method involving the use of an acyl halide also has the defect that a large amount of the phosphorus compound must be used in preparing the solid titanium catalyst component.

Japanese Patent Publication No. 5872/76 (published on Feb. 23, 1976) discloses a method in which in order to increase the yield of the olefin polymer per unit weight of carrier and per unit weight of transition metal, there is used a solid titanium catalyst component prepared by reacting magnesium oxide having an iodine adsorption value of 0 to 50 mg/g-MgO with at least one compound selected from the group consisting of organic carboxylic acids, organic ketones, aliphatic alcohols, phosphoric acid esters and benzoic acid esters, and thereafter reacting the resulting product with a halogen compound of titanium or vanadium to deposit at least 20 mg, per gram of the magnesium oxide, of a titanium or vanadium atom on the magnesium oxide. All of the working examples in this Patent Publication relate to the polymerization of ethylene, and do not at all show the use of a combination of the phosphoric acid ester and the benzoic acid ester. Furthermore, the Publication is silent on the use of the electron donor (C) which is essential to the catalyst of the present invention. Even when the solid titanium catalyst component having magnesium, halogen, titanium and phosphorus or carboxylic acid in accordance with this Patent Publication is used in the polymerization or copolymerization of alpha-olefins having at least 3 carbon atoms, the resulting polymers have low stereoregularity, and a satisfactory catalytic activity cannot be obtained.

There was also suggested the use, for the purpose of increasing the flow characteristics of the resulting polymer, of a solid titanium catalyst component having magnesium, halogen, titanium and phosphorus which is obtained by co-pulverizing a magnesium halide, a compound of the formula P(OR)₃ wherein groups R are identical or different and each represents a $C_1$–$C_{20}$ alkyl, aryl or aralkyl group, a tetravalent titanium compound and a trivalent titanium compound (Japanese Laid-Open Patent Publication No. 32985/77 published on Mar. 12, 1977). The titanium catalyst component of this Publication does not contain a carboxylic acid ester. It does not disclose the use of the electron donor (C) which is essential to the catalyst of the present invention. All of the working examples of this Publication show the polymerization of ethylene alone. Even if the titanium catalyst component in accordance with this Publication is used in the polymerization or copolymerization of alpha-olefins having at least 3 carbon atoms, the resulting polymers will have low stereoregularity, and a satisfactory catalytic activity cannot be obtained.

The present inventors made extensive investigations in order to overcome the disadvantages of the prior techniques, and found that these disadvantages can be effectively overcome by using a catalyst composed of (A) a solid titanium catalyst component having magnesium, halogen, titanium, phosphorus and a carboxylic acid ester, (B) an organometallic compound and (C) an electron donor which meets a specified set of parameters, i.e. the molar ratio of phosphorus to the carboxylic acid ester in the titanium catalyst component and the specific surface area of the titanium catalyst component.

It has thus been found that there can be provided a process for polymerizing or copolymerizing alpha-olefins having at least 3 carbon atoms which can afford highly stereoregular polymers or copolymers with high catalytic activity, and in which the stereoregularities of the polymers or copolymers scarcely change even when their melt flow index is increased.

It is an object of this invention therefore to provide an improved process for producing a polymer or copolymer of an alpha-olefin having at least 3 carbon atoms.

The above and other objects and advantages of this invention will become more apparent from the following description.

In the present invention, the stereoregularity of a polymer is expressed by isotacticity index (I.I.), i.e., the percentage of its portion which is insoluble in boiling n-heptane. The boiling n-heptane extraction residue is measured in the following manner. The polymer is extracted in boiling n-heptane for 6 hours, and the weight percent of the residue left after extraction is determined.

The melt flow index (M.I.), used herein, is a value measured under the condition L of ASTM D-1238-73 (i.e., under a load of 2160 g and at a temperature of 230° C.).

The catalyst of this invention shows the unique property of affording a polymer which has a high I.I. even in the low molecular weight range, i.e., the high MI range, in which a portion of the polymer which has low stereoregularity can be almost completely extracted. This is presumably because a polymer having low stereoregularity and a high molecular weight scarcely forms.

The solid titanium catalyst component (A) used in this invention essentially contains magnesium, halogen, titanium, phosphorus and a carboxylic acid ester. The solid titanium catalyst component is provided in the form of a reaction product among a magnesium-containing compound such as a magnesium dihalide, a halogen compound of a tetravalent titanium, a carboxylic acid ester and a phosphorus-containing compound.

In the solid titanium catalyst component (A), the magnesium/titanium mole ratio is preferably more than 1, more preferably from about 3 to about 40, especially preferably from about 5 to about 30; the halogen/titanium mole ratio is preferably at least about 4, more preferably from about 4 to about 100, especially preferably from about 10 to about 90, above all from about 20 to about 80; and the mole ratio of the carboxylic acid ester to titanium is preferably at least about 0.2, more preferably from about 0.2 to about 10, especially preferably from about 0.4 to about 6, above all from about 0.4 to about 3. The mole ratio of the phosphorus to the carboxylic acid ester in the component (A) is from about 0.05 to about 2, preferably from about 0.1 to about 1. If the mole ratio of phosphorus to the carboxylic acid ester is higher than the specified limit, the I.I. of the polymer varies unnegligibly with variations in M.I.

At least about 80% by weight, preferably at least about 90% by weight, of the tetravalent titanium compound in the component (A) is insoluble in boiling n-heptane. Desirably, at least about 50% by weight, preferably at least about 70% by weight, of the tetravalent titanium compound insoluble in boiling n-heptane is insoluble in $TiCl_4$ at 80° C.

In addition to having the aforesaid specified mole ratio of phosphorus to the carboxylic acid ester, the solid titanium component (A) used in this invention should have a specific surface area of not less than about 40 $m^2/g$, preferably at least about 100 $m^2/g$, especially from about 100 to about 500 $m^2/g$. The solid titanium compound shown as a comparison in the above-cited Japanese Laid-Open Patent Publication No. 1276/78 has a low specific surface area, and the desired result cannot be obtained.

The specific surface area of the solid titanium compound (A) is determined by an ordinary BET method.

The titanium catalyst component (A) used in this invention is generally characterized in that in its X-ray spectrum, the most intense line appearing in the X-ray spectrum of magnesium chloride defined in ASTM 3-0854 and the X-ray spectrum of magnesium bromide defined in ASTM 15-836 exhibits a reduced relative intensity and appears asymmetrically broadened, thus forming a halo showing an intensity peak shifted with respect to the interplanar distance d of the maximum intensity line; or characterized in that the aforesaid maximum intensity line is no longer present and a halo having an intensity peak shifted with respect to the distance d of the above line appears in its place.

When $MgCl_2$ is used in preparing the component (A), the peak of the intensity of the halo exists between d=2.44 Å and d=2.97 Å.

The solid titanium catalyst component (A) containing magnesium, halogen, titanium, phosphorus and carboxylic acid ester can be prepared by various means.

For example, there can be cited a method which comprises treating a composition or carrier containing a magnesium halide, a carboxylic acid ester and a phosphorus compound in which the molar ratio of the magnesium halide to the carboxylic acid ester is at least about 1, preferably from about 1 to about 15, and the molar ratio of the magnesium halide to the phosphorus compound is at least about 2, preferably from about 2 to about 40, with a liquid tetravalent titanium compound under such conditions that the desired amount of the titanium compound is fixed to the composition or carrier, and then separating the solid reaction product from the liquid layer under such conditions that products soluble in boiling n-heptane and products capable of being extracted with titanium tetrachloride at 80° C. do not substantially remain.

A suitable composition or carrier to be treated with the liquid titanium compound has the feature that it provides an X-ray spectrum in which the diffraction line of the maximum intensity appearing in the spectrum of the corresponding magnesium halide of a normal type exhibits a decreased relative intensity and appears asymmetrically broadened so as to form a halo in which the intensity peak is shifted with respect to the maximum intensity line, or the maximum intensity line is not present in the spectrum and instead, a halo having an intensity peak shifted with respect to distance d of the maximum intensity line appears.

The carrier used for the formation of the titanium catalyst component (A) can be provided by various means.

A preferred method comprises mechanically pulverizing a magnesium halide, especially a magnesium dichloride or dibromide, a carboxylic acid ester and a phosphorus compound in the optional presence of a titanium compound and/or an inert co-carrier such as $SiO_2$ or $Al_2O_3$, and/or a pulverization aid such as a silicone oil, ethyl silicate or vinyl triethoxy silane which can facilitate pulverization, until the aforesaid halo having an intensity peak shifted with respect to the maximum intensity line appears in the X-ray spectrum of the pulverized product.

Such a mechanically pulverizing means is known, and includes, for example, a ball mill, a vibratory mill, and a colloid mill. The pulverization can be performed, for example, at a temperature from room temperature to about 100° C., for a period of about 1 hour to about 10 days.

Then, the pulverized product is preferably treated in the absence of mechanical pulverization with a liquid titanium halide at a temperature (generally between room temperature and 200° C.) and for a period of time sufficient for fixing a suitable amount of the titanium compound.

Prior to the treatment with the liquid titanium halide, the pulverized product may also be treated in the absence of mechanical pulverization with organic compounds containing active hydrogen and at least one compound selected from organometallic compounds of metals of Groups I to III of the periodic table used as catalyst component (B), halogen-containing silicon compounds, and halogen-containing tin compounds.

Examples of the above active hydrogen-containing compound are aliphatic alcohols containing 1 to 12 carbon atoms, alicyclic alcohols containing 3 to 12 carbon atoms, preferably 6 to 12 carbon atoms, aromatic alcohols containing 7 to 18 carbon atoms, and phenols containing 6 to 18 carbon atoms.

Specific examples of these compounds include alcohols such as methanol, ethanol, n- or iso-propanol, n-, iso-, sec- or tert-butanol, n-pentanol, 2-methyl butanol, hexanol, 2-ethylhexanol, ethyleneglycol monomethylether, mono-n-butylether or monophenylether, cyclopentyl alcohol, cyclohexanol, 2,6-dimethylcyclohexanol, menthol, benzyl alcohol, phenethyl alcohol, and cumyl alcohol; and phenols such as phenol, cresol, xylenol, butyl phenol, octyl phenol, nonyl phenyl, dibutyl phenol, naphthol, and cumyl phenol.

The solid product of the reaction is then separated from the liquid layer, for example by filtration, sedimentation, etc., preferably under such conditions of temperature and/or dilution with the liquid titanium compound that after extraction first with boiling n-heptane and then with $TiCl_4$ at 80° C., the solid product no longer contains more than 20% and 50% by weight respectively of extractable Ti compounds.

In the above method, a magnesium alkoxyhalide, magnesium aryloxyhalide, magnesium alkoxide, magnesium aryloxide, etc. may be used instead of the magnesium halide. An optional halogenating agent may be used at the time of mechanical pulverization in this method.

Another method for preparing a carrier used in the formation of the titanium catalyst component (A) comprises reacting an anhydrous magnesium halide with the organic compound containing active hydrogen, the carboxylic acid ester and the phosphorus compound in any desired sequence, and then treating the reaction product with an organoaluminum compound or a silicon halide.

The sequence of reactions may be changed. For example, it is possible to treat the complex between the magnesium halide and the active hydrogen-containing compound with the organoaluminum compound or silicon halide, and treat the resulting product with the carboxylic acid ester and phosphorus compound.

The resulting product may be washed with an inert hydrocarbon solvent to remove traces of free organometallic compound, and then with a liquid titanium compound, particularly $TiCl_4$, at a temperature of from about 20° to about 200° C. The solid reaction product is preferably separated from the liquid layer so that titanium compounds extractable with boiling n-heptane and with titanium tetrachloride at 80° C. do not remain on the solid component.

When a magnesium halide is used in the above process (especially when the carrier is produced by pulverization), the magnesium halide is preferably as anhydrous as possible (containing less than 1% by weight of $H_2O$).

Another method for the production of the titanium catalyst component (A) comprises reacting an aryloxy halide or aralkoxy halide of magnesium with the carboxylic acid ester and phosphorus compound and then reacting the resulting product with a titanium halide.

The titanium catalyst component (A) may also be produced by reacting a reaction product among an organic compound, alkoxide, aryloxide, alkoxyhalide, or aryloxy halide of magnesium, a halogenation agent, the carboxylic acid ester and the phosphorus compound, with a titanium halide.

It is possible in the production of the titanium catalyst component (A) to employ a hydrated Mg halide containing generally from 0.1 to 6 moles of $H_2O$ per mole of halide. Furthermore, it is possible to use oxygen-containing Mg compounds such as MgO, $Mg(OH)_2$, Mg(OH)Cl, Mg carbonate, Mg salts of organic acids, Mg silicate, Mg aluminates, Mg alcoholates and halogenated derivatives thereof. In this case, the oxygen-containing Mg compound or the hydrated compound is reacted with titanium tetrachloride in excess, operating preferably at the boiling point of the tetrachloride and then hot-separating the solid product, preferably at the $TiCl_4$ boiling point.

The resulting solid product is treated in suspension in an inert hydrocarbon with a carboxylic acid ester, in particular with an ester of an aromatic carboxylic acid and a phosphorus compound, in amounts equal to about 1–20 moles and about 0.05–0.5 moles per g-atom of Ti contained in the carrier, respectively, operating at temperatures ranging from room temperature to 200° C.

The solid product treated by this method is separated from the unreacted ester and phosphorus compound and reacted with a liquid titanium halide compound. The product can be separated from the reaction mixture under the conditions described hereinabove with regard to the other embodiments of production.

Preferably, at least 80% by weight of the titanium compound included in the solid titanium catalyst component (A) is insoluble in boiling n-heptane. Moreover, at least 50% by weight of the titanium compound insoluble in boiling n-heptane is preferably not extractable with titanium tetrachloride at 80° C. In fact, the presence of the titanium compound soluble in boiling n-heptane is not only disadvantageous to the activity and stereospecificity of the catalyst, but also tends to reduce the advantage that the stereoregularity of the resulting polymer scarcely varies with its M.I. when the polymerization is carried out in the presence of hydrogen.

In the present invention, the titanium catalyst component (A) may be treated with a reducing agent prior to contacting with the other catalyst components (B) and/or (C), thereby reducing the titanium in the component (A) to a lower valency state. Any known reducing agents capable of reducing titanium tetrachloride to titanium trichloride can be used as such reducing agents. Examples are metallic aluminum, organometallic compounds, and hydrogen.

Examples of preferred carboxylic acid esters used to form the titanium catalyst component (A) are aromatic carboxylic acid esters such as benzoates, toluates and anisates. Specific examples are given hereinbelow for carboxylic acid esters, preferably $C_2$–$C_{40}$ carboxylic acid esters, especially aromatic carboxylic acid esters having 8 to 40 carbon atoms, preferably 8 to 18 carbon atoms, which are among the electron donors used as catalyst component (C).

Examples of preferred phosphorus compounds used in the formation of the titanium catalyst component (A) include compounds of the formulae

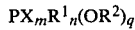   (1)

and

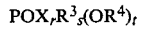   (2).

wherein X is a halogen atom, each of $R^1$, $R^2$, $R^3$ and $R^4$ is selected from hydrocarbon groups having 1 to 20 carbon atoms, e.g. alkyl, alkenyl and aryl groups, and the halogen-substituted derivatives thereof, and $R^1$ and $R^2$ are identical or different and $R^3$ and $R^4$ are identical or different, $m+n+q=3$, $0 \leq m \leq 3$, $0 \leq n < 3$, $0 \leq q \leq 3$, $r+s+t=3$, $0 \leq r \leq 3$, $0 \leq s < 3$, and $0 \leq t \leq 3$.

Examples of the compounds of formula (1) include phosphorus trichloride, phosphorus tribromide, diethyl chlorophosphite, diphenyl chlorophosphite, diphenyl bromophosphite, methyl dichlorophosphite, phenyl dichlorophosphite, trimethyl phosphite, triethyl phosphite, tri-n-propyl phosphite, tri-n-butyl phosphite, trinonylphenyl phosphite, trioctyl phosphite, tridecyl phosphite, triphenyl phosphite, diphenyl-2-chloroethyl phosphite, tris(2-chloroethyl) phosphite, ethyldiethyl phosphinite, phenyldiphenyl phosphinite, ethylphenylethyl phosphinite, ethyldiphenyl phosphinite, diethylethyl phosphonite, and diethylphenyl phosphonite.

Examples of the phosphorus compounds of formula (2) include phosphorus oxychloride, diethyl phosphorochloridate, diphenyl phosphorochloridate, ethyl phosphorodichloridate, phenyl phosphorodichloridate, triethyl phosphate, tri-n-butyl phosphate, triphenyl phosphate, ethyldimethyl phosphinate, ethyl n-butyl phosphinate, ethyldiphenyl phosphinate, dimethylmethyl phosphonate, diethylethyl phosphonate, diphenylphenyl phosphonate, and diphenyl-2-chloroethyl phosphonate.

The catalyst used in this invention is composed of (A) the solid titanium catalyst component described above containing magnesium, halogen, titanium, phosphorus and carboxylic acid ester in which the mole ratio of the phosphorus to the carboxylic acid ester is from about 0.05 to about 2 and which has a specific surface area of not less than about 40 m²/g, (B) an organometallic compound of a metal of Groups I to III of the Mendelejeff's periodic table, and (C) an electron donor.

The organometallic compound of the metal of Groups I to III of the periodic table used as component (B) contains a hydrocarbon group directly bonded to the metal. Examples include alkyl aluminums, alkyl aluminum alkoxides, alkyl aluminum phenoxides, alkyl aluminum hydrides, alkyl aluminum halides, alkyl aluminum alkoxyhalides, dialkyl zincs, dialkyl magnesiums, and alkyl magnesium halides. The alkyl and alkoxy groups in these compounds preferably have 1 to 12 carbon atoms.

Examples of preferred organometallic compounds as component (B) include trialkyl aluminums such as $Al(CH_3)_3$, $Al(C_2H_5)_3$, $Al(C_3H_7)_3$, $Al(C_4H_9)_3$ and $Al(C_{12}H_{25})_5$; alkyl aluminum compounds of the structure in which a plurality of aluminum atoms are connected via an oxygen or nitrogen atom, such as $(C_2H_5)_2AlOAl(C_2H_5)_2$ and

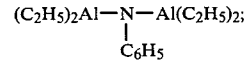

dialkyl aluminum hydrides such as $(C_2H_5)_2AlH$ and $(C_4H_9)_2AlH$; dialkyl aluminum halides such as $(C_2H_5)_2AlCl$, $(C_2H_5)_2AlI$ and $(C_4H_9)_2AlCl$; alkyl aluminum sesquihalides such as $(C_2H_5)_3Al_2Cl_3$, $(C_4H_9)_3Al_2Cl_3$, $(C_2H_5)_3Al_2Br_3$ and $(C_4H_9)_3Al_2Br_3$; alkyl aluminum dihalides such as $(C_2H_5)AlCl_2$, $(C_2H_5)AlBr_2$, $(C_4H_9)AlCl_2$ and $(C_4H_9)AlCl_2$; and dialkyl aluminum alkoxides or phenoxides such as $(C_2H_5)_2Al(OC_2H_5)$ and $(C_2H_5)_2Al(OC_6H_5)$. Trialkyl aluminums, and mixtures thereof with alkyl aluminum halides are most suitable.

The electron donor as component (C) includes, for example, amines, amides, ethers, ketones, nitriles, phosphines, stibines, arsines, phosphoramides, esters, thioethers, thioesters, acid anhydrides, acid halides, aldehydes, alcoholates, and salts of organic acids with metals of Groups I to IV of the periodic table. The salts may be formed in situ by the reaction of organic acids and the organometallic compounds used as component (B).

Specific examples of the electron donors are aromatic carboxylic acids such as benzoic acid, p-hydroxybenzoic acid; acid anhydrides such as succinic anhydride, benzoic anhydride, and p-toluic anhydride; ketones having 3 to 15 carbon atoms such as acetone, methyl ethyl ketone, methyl isobutyl ketone, acetophenone, benzophenone, cyclohexanone and benzoquinone; aldehydes having 2 to 15 carbon atoms such as acetaldehyde, propionaldehyde, octylaldehyde, benzaldehyde, tolualdehyde and naphthoaldehyde; aliphatic carboxylic acid esters having 2 to 40 carbon atoms such as methyl formate, methyl acetate, ethyl acetate, vinyl acetate, propyl acetate, octyl acetate, cyclohexyl acetate, ethyl propionate, methyl butyrate, ethyl valerate, octyl valerate, ethyl caprate, ethyl enanthoate, ethyl caprylate, methyl chloroacetate, ethyl dichloroacetate, methyl methacrylate, ethyl crotonate, ethyl pivalate and dimethyl maleate; alicyclic carboxylic acid esters having 7 to 20 carbon atoms such as ethyl cyclohexanecarboxylate; aromatic carboxylic acid esters having 8 to 40 carbon atoms, preferably 8 to 18 carbon atoms, such as methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethylhexyl toluate, ethyl ethylbenzoate, methyl anisate, ethyl anisate, ethyl ethoxybenzoate, ethyl p-butoxybenzoate, ethyl o-chlorobenzoate and ethyl naphthoate; lactones having 4 to 10 carbon atoms such as γ-butyrolactone, δ-valerolactone, coumarine and phthalide; inorganic acid esters such as ethylene carbonate, triethyl borate, alkyl silicates and aryl silicates; acid halides containing 2 to 15 carbon atoms such as acetyl chloride, benzoyl chloride, methyl benzoyl chloride and methoxy benzoyl chloride; ethers having 2 to 20 carbon atoms such as methyl ether, ethyl ether, isopropyl ether, n-butyl ether, amyl ether, tetrahydrofuran, anisole, diphenyl ether, and ethylene glycol butyl ether; acid amides such as acetamide, benzamide and toluamide; amines such as tributylamine, N,N'-dimethylpiperazine, tribenzylamine, aniline, pyridine, picoline and tetramethyl ethylenediamine; nitriles such as acetonitrile, benzonitrile and tolunitrile; and other compounds such as tetramethylurea, nitrobenzene and lithium butyrate.

Especially good results can be obtained when esters, ethers, ketones or acid anhydrides are used as the electron donor (C). Especially advantageous are alkyl esters of aromatic carboxylic acid such as $C_1$-$C_8$ alkyl esters of aromatic carboxylic acids such as benzoic acid, p-methoxy- or ethoxybenzoic acid or toluic acid. Good results can also be obtained when using aromatic ketones such as benzoquinone, aromatic carboxilic acid anhydrides such as benzoic anhydride, and ethers such as ethylene glycol butyl ether.

The proportion of the component (C) is usually about 0.01 to about 1 mole, preferably about 0.1 to about 0.5 mole, per atom of the total metallic atoms of Groups I to III of the periodic table in the catalyst component (B).

Alpha-olefins that can be used in this invention are, for example, those having 3 to 8 carbon atoms such as propylene, 1-butene, 1-hexene, 4-methyl-1-pentene, and 1-octene. They can be subjected not only to homopolymerization but also to random copolymerization and block copolymerization. In the copolymerization, ethylene and/or an unsaturated compound such as a conjugated or non-conjugated diene can be selected as a comonomer. For example, in the copolymerization of propylene, there can be used a method which comprises polymerizing propylene until a homopolymer of propylene is formed in an amount corresponding to about 60 to about 90% of the total composition to be obtained, and subsequently, polymerizing a mixture of propylene and ethylene or ethylene. Or a mixture of propylene and ethylene may be polymerized until a copolymer having an ethylene content of not more than about 5% by weight is obtained.

The polymerization can be performed either in the liquid phase or in the vapor phase. In the case of the liquid phase polymerization an inert solvent such as hexane, heptane or kerosene may be used as a reaction medium. The olefin itself may also be used as a reaction medium. In the liquid-phase polymerization, it is preferred to use the component (A) in an amount of about 0.0001 to about 1 millimole calculated as the titanium atom, the component (B) in an amount of about 0.001 to about 1000 millimoles calculated as the metal atom, and the component (C) in an amount of about 0.001 to about 100 millimoles, all per liter of liquid phase, and to adjust the proportion of the metal atom in the catalyst component (B) to about 1 to about 1000 moles, preferably about 1 to about 300 moles, per gram-atom of Ti in the catalyst component (A).

The vapor-phase polymerization is carried out usually by a method involving the use of a fluidized bed or a stirred fluidized bed. The catalyst component (A), either as a solid or as diluted with hexane, olefin, etc., and the catalyst components (B) and (C) with or without being diluted with hexane, olefin, etc. are fed into a polymerization vessel, and in the meanwhile, the olefin in gaseous state optionally together with hydrogen, etc. is fed into the vessel and polymerized. The proportions of the catalyst components are the same as in the case of the liquid-phase polymerization.

The polymerization temperature for the olefin is generally from about 20° to about 200° C., preferably from about 50° to about 180° C. In particular, the highly stereoregular polymerization of propylene is carried out preferably at a temperature of about 50° to about 130° C. and a pressure of from atmospheric pressure to about 50 kg/cm²·gauge, preferably from about 2 to about 20 Kg/cm²·gauge. Hydrogen, etc. may be used as a molecular weight controlling agent for the desired polymer.

The following examples specifically illustrate the present invention.

EXAMPLE 1

Preparation of catalyst component (A)

Anhydrous magnesium chloride (20 g), 5.0 ml of ethyl benzoate and 4.6 ml of triphenyl phosphite were charged under a nitrogen atmosphere into a stainless steel (SUS-32) ball mill having an inner capacity of 800 ml and an inside diameter of 100 mm and containing 2.8 kg of stainless steel (SUS-32) balls each having a diameter of 15 mm, and were contacted with each other for 24 hours at an acceleration of impact of 7G. The resulting co-pulverized product (10 g) was suspended in 100 ml of titanium tetrachloride and contacted with stirring at 80° C. for 2 hours. The solid portion was collected by filtration, and sufficiently washed with purified hexane until no free titanium tetrachloride was detected in the wash liquid. The washed solid was then dried to form a catalyst component (A). This component contained as atoms 2.2% by weight of titanium, 62.0% by weight of chlorine, 20.0% by weight of magnesium, 0.8% by weight of phosphorus, and 7.3% by weight of ethyl benzoate, and the mole ratio of phosphorus to the ethyl benzoate was 0.53. The component had a specific surface area of 173 m²/g.

Polymerization

A 2-liter autoclave was charged with 750 ml of purified hexane, and propylene at room temperature. Under an atmosphere of propylene, 3.75 millimoles of triethyl aluminum and 1.25 millimoles of methyl p-toluate were fed into the autoclave, and 5 minutes later, 0.0225 millimole, calculated as titanium atom, of the catalyst component (A) was introduced. Hydrogen (500 ml) was introduced, and propylene was polymerized at 60° C. for 4 hours. During the polymerization, the pressure was maintained at 7 kg/cm$^2$·G.

After the polymerization, the slurry containing the resulting polymer was filtered to separate it into a white powdery polymer and a liquid layer. After drying, the yield of the white powdery polymer was 256 g. The polymer had a boiling n-heptane extraction residue of 95.0%, an MI of 4.0, and an apparent density of 0.39 g/ml. Concentration of the liquid layer afforded 8.4 g of a solvent-soluble polymer. The catalyst therefore had an activity of 11,800 g of PP (polypropylene)/mmol of Ti and the polymer had an I.I. of 92.0%.

EXAMPLES 2 and 3

Example 1 was repeated except that the amount of hydrogen added at the time of polymerization was varied. The results are shown in Table 1.

TABLE 1

| Example | Amount of hydrogen added (ml) | White powdery polymer | | | | | | |
|---|---|---|---|---|---|---|---|---|
| | | Yield (g) | n-Heptane extraction residue (%) | M.I. | Apparent density (g/ml) | Solvent-soluble polymer (g) | Activity (g-pp/ mmol-Ti) | I.I. (%) |
| 2 | 100 | 251 | 95.1 | 1.7 | 0.40 | 7.8 | 11,500 | 92.2 |
| 3 | 1,000 | 236 | 94.6 | 13.0 | 0.40 | 7.8 | 10.800 | 91.6 |

COMPARATIVE EXAMPLES 1 TO 3

A catalyst component (A) was prepared in the same way as in Example 1 except that triphenyl phosphite was not used. The resulting component contained as atoms 2.5% by weight of titanium, 64.0% by weight of chlorine, 20.0% by weight of magnesium and 9.3% by weight of ethyl benzoate, and had a specific surface area of 190 m$^2$/g. Propylene was polymerized in the same way as in Example 1 except that the amount of hydrogen was changed. The results are shown in Table 2.

TABLE 2

| Comparative Example | Amount of hydrogen added (ml) | White powdery polymer | | | | | | |
|---|---|---|---|---|---|---|---|---|
| | | Yield (g) | n-Heptane extraction residue (%) | M.I. | Apparent density (g/ml) | Solvent-soluble polymer (g) | Activity (g-pp/ mmol-Ti) | I.I. (%) |
| 1 | 100 | 263 | 95.9 | 1.5 | 0.33 | 6.4 | 12,000 | 93.6 |
| 2 | 500 | 260 | 95.1 | 3.8 | 0.33 | 8.1 | 11,900 | 92.2 |
| 3 | 800 | 253 | 93.9 | 13.3 | 0.32 | 9.8 | 11,700 | 90.4 |

COMPARATIVE EXAMPLES 4 TO 6

A catalyst component (A) was prepared in the same way as in Example 1 except that ethyl benzoate was not used and the amount of the triphenyl phosphite was changed to 9.2 ml. The resulting catalyst component contained as atoms 1.5% by weight of titanium, 70.0% by weight of chlorine, 25.0% by weight of magnesium, and 0.5% by weight of phosphorus. Propylene was polymerized in the same way as in Example 1 except that the amount of hydrogen was varied. The results are shown in Table 3.

TABLE 3

| Comparative Example | Amount of hydrogen added (ml) | White powdery polymer | | | | | | |
|---|---|---|---|---|---|---|---|---|
| | | Yield (g) | n-Heptane extraction residue (%) | M.I. | Apparent density (g/ml) | Solvent-soluble polymer (g) | Activity (g-pp/ mmol-Ti) | I.I. (%) |
| 4 | 100 | 183 | 92.8 | 6.6 | 0.14 | 15.1 | 8,800 | 85.7 |
| 5 | 500 | 180 | 91.6 | 17.0 | 0.13 | 16.2 | 8,700 | 84.0 |
| 6 | 800 | 175 | 89.5 | 53.6 | 0.14 | 15.9 | 8.500 | 82.0 |

The relation between M.I. and I.I. in the polymers obtained in Examples 1 to 3 and Comparative Examples 1 to 6 is shown in FIG. 1. In FIG. 1, ○ refers to the results obtained in Examples 1 to 3; ⊙, to the results obtained in Comparative Examples 1 to 3; and Δ, to the results obtained in Comparative Examples 4 to 6. It is seen from FIG. 1 that in the present invention, variations in I.I. with M.I. are so slight that they can be ignored, but in Comparative Examples 1 to 6, I.I. changes greatly with M.I.

EXAMPLES 4 TO 13

A catalyst component (A) was prepared in the same way as in Example 1 except that each of the phosphorus compounds shown in Table 4 was used instead of the triphenyl phosphite. Propylene was polymerized in the same way as in Example 1 except that the amount of hydrogen was changed. The compositions and specific surface areas of the catalyst components (A), and the results of polymerizations are shown in Table 4.

TABLE 4

| Example | Phosphorus compound (ml) | Composition (wt. %) | | | | Ethylbenzoate (P/ethyl benzoate mole ratio) | Specific surface area (m²/g) | Amount of hydrogen added (ml) | White powdery polymer | | | | Solvent soluble polymer (g) | Activity ($\frac{g-pp}{mmol-Ti}$) | I.I. (%) |
| | | Ti | Cl | Mg | P | | | | Yield (g) | n-Heptane extraction residue (%) | M.I. | Apparent density (g/ml) | | | |
| --- | --- | --- | --- | --- | --- | --- | --- | --- | --- | --- | --- | --- | --- | --- | --- |
| 4 | Triethyl phosphite | 2.7 | 56.0 | 19.0 | 1.6 | 10.9 | 120 | 500 | 174 | 95.1 | 4.2 | 0.33 | 5.7 | 8,000 | 92.1 |
| 5 | (3.0) | | | | | (0.71) | | 800 | 172 | 94.8 | 10.5 | 0.34 | 6.3 | 7,900 | 91.5 |
| 6 | Tri-n-butyl phosphite | 2.8 | 55.0 | 19.0 | 1.6 | 10.2 | 108 | 500 | 180 | 94.4 | 3.5 | 0.35 | 6.8 | 8,300 | 91.0 |
| 7 | (4.7) | | | | | (0.76) | | 800 | 191 | 94.1 | 11.9 | 0.34 | 7.2 | 8,800 | 90.7 |
| 8 | Tris(2-chloroethyl) phosphite | 2.3 | 57.0 | 19.0 | 1.7 | 8.6 | 136 | 500 | 162 | 94.4 | 5.3 | 0.32 | 6.2 | 7,500 | 90.9 |
| 9 | (3.5) | | | | | (0.96) | | 800 | 163 | 94.7 | 10.2 | 0.33 | 7.0 | 7,600 | 90.8 |
| 10 | Triphenyl phosphate | 1.4 | 65.0 | 23.0 | 0.2 | 5.5 | 105 | 500 | 244 | 94.4 | 4.5 | 0.33 | 10.8 | 11,300 | 94.0 |
| 11 | (5.7) | | | | | (0.18) | | 800 | 238 | 90.4 | 9.9 | 0.34 | 11.4 | 11,100 | 89.7 |
| 12 | Diphenyl phosphorochloridate | 2.2 | 63.0 | 19.0 | 1.1 | 9.0 | 159 | 500 | 306 | 94.7 | 3.1 | 0.35 | 10.3 | 14,100 | 91.6 |
| 13 | (3.6) | | | | | (0.59) | | 800 | 292 | 94.2 | 11.0 | 0.35 | 11.2 | 13,500 | 90.7 |

EXAMPLES 14 TO 16

Preparation of catalyst component (A)

Anhydrous magnesium chloride (5 g) was suspended in 100 ml of purified kerosene, and 14.4 ml of n-butanol was added dropwise to the suspension at room temperature. The mixture was heated to 120° C., and reacted for 1 hour with stirring. The temperature of the reaction mixture was returned to room temperature, and 2.3 ml of ethyl benzoate and 0.23 ml of phosphorus trichloride were added and reacted for 1 hour. Then, 9.9 ml of diethyl aluminum monochloride was added dropwise at 10° C. over the course of 1 hour. After the addition, they were reacted at room temperature for 3 hours, followed by filtration, washing with hexane, and drying. The resulting solid portion was suspended in 100 ml of titanium tetrachloride, and contacted at 100° C. for 2 hours with stirring. The solid portion was collected by filtration, and sufficiently washed with purified hexane until no free titanium tetrachloride was detected in the wash liquid. The washed product was dried to obtain a catalyst component (A). This component contained as atoms 3.4% by weight of titanium, 58.0% by weight of chlorine, 18.0% by weight of magnesium, 1.3% by weight of phosphorus and 10% by weight of ethyl benzoate, and the mole ratio of phosphorus to ethyl benzoate was 0.62. The specific surface area of the component (A) was 302 m²/g.

Polymerization

Propylene was polymerized in the same way as in Example 1 except that the amount of hydrogen was changed.

The results of polymerization are shown in Table 5.

TABLE 5

| Example | Amount of hydrogen added (ml) | White powdery polymer | | | | Solvent-soluble polymer (g) | Activity ($\frac{g-pp}{mmol-Ti}$) | I.I. (%) |
| | | Yield (g) | n-Heptane extraction residue (%) | M.I. | Apparent density (g/ml) | | | |
| --- | --- | --- | --- | --- | --- | --- | --- | --- |
| 14 | 100 | 261 | 95.8 | 1.1 | 0.34 | 6.0 | 11,900 | 93.6 |
| 15 | 500 | 253 | 95.2 | 3.9 | 0.32 | 5.3 | 11,500 | 93.2 |
| 16 | 800 | 260 | 95.2 | 10.5 | 0.33 | 6.8 | 11,900 | 92.8 |

COMPARATIVE EXAMPLES 7 TO 9

A catalyst component (A) was prepared in the same way as in Examples 14 to 16 except that phosphorus trichloride was not used. The resulting component contained as atoms 3.4% by weight of titanium, 63.0% by weight of chlorine, 20.0% by weight of magnesium, and 9.0% by weight of ethyl benzoate, and had a specific surface area of 289 m²/g. Propylene was polymerized in the same way as in Example 1 except that the amount of hydrogen was varied.

The results of polymerization are shown in Table 6.

TABLE 6

| Comparative Example | Amount of hydrogen added (ml) | White powdery polymer | | | | Solvent-soluble polymer (g) | Activity ($\frac{g - pp}{mmol - Ti}$) | I.I. (%) |
| --- | --- | --- | --- | --- | --- | --- | --- | --- |
| | | Yield (g) | n-Heptane extraction residue (%) | M.I. | Apparent density (g/ml) | | | |
| 7 | 100 | 252 | 96.0 | 1.3 | 0.33 | 5.0 | 11,400 | 94.1 |
| 8 | 500 | 260 | 95.2 | 3.5 | 0.32 | 8.2 | 11,900 | 92.3 |
| 9 | 800 | 257 | 94.2 | 10.2 | 0.32 | 9.6 | 11,800 | 90.8 |

The relation between M.I. and I.I. in the polymers obtained in Examples 14 to 16 and Comparative Examples 7 to 9 is shown in FIG. 2. In FIG. 2, ○ refers to the results obtained in Examples 14 to 16; and ○, to the results obtained in Comparative Examples 7 to 9. It is seen from FIG. 2 that in the present invention, the variations of I.I. with M.I. are so slight that they can be ignored, but in the Comparative Examples, I.I. varies greatly with variations in M.I.

EXAMPLES 17 TO 26 AND COMPARATIVE EXAMPLES 10 AND 11

A catalyst component (A) was prepared in the same way as in Examples 14 to 16 except that the amount of phosphorus trichloride was changed, or another organic acid ester was used instead of ethyl benzoate, or another phosphorus compound was used instead of phosphorus trichloride. Propylene was polymerized in the same way as in Example 1 except that the amount of hydrogen was changed. The compositions and specific surface areas of the catalyst components (A) and the amount of hydrogen added (Table 7-A) and the results of polymerization (Table 7-B) are shown in Table 7.

TABLE 7A

| | Carboxylic acid ester (ml) | Phosphorus compound (ml) | Composition (wt. %) | | | | Carboxylic acid ester (mole ratio of P to carboxylate) | Specific surface area (m²/g) | Amount of hydrogen added (ml) |
| --- | --- | --- | --- | --- | --- | --- | --- | --- | --- |
| | | | Ti | Cl | Mg | P | | | |
| Example | | | | | | | | | |
| 17 | Ethyl benzoate | Phosphorus trichloride | 3.0 | 57.0 | 17.0 | 2.0 | 9.8 | 271 | 500 |
| 18 | 2.3 | 0.46 | | | | | (0.99) | | 800 |
| 19 | p-Methyl toluate | Phosphorus trichloride | 2.9 | 58.0 | 17.0 | 1.9 | 10.4 | 268 | 500 |
| 20 | 2.3 | 0.24 | | | | | (0.88) | | 800 |
| 21 | p-Ethyl anisate | Phosphorus trichloride | 3.3 | 57.0 | 17.0 | 1.7 | 11.3 | 305 | 500 |
| 22 | 2.6 | 0.23 | | | | | (0.87) | | 800 |
| 23 | Ethyl benzoate | Phosphorus trichloride | 3.1 | 61.0 | 20.0 | 0.4 | 11.2 | 297 | 500 |
| 24 | 2.3 | 0.48 | | | | | (0.17) | | 800 |
| 25 | Ethyl benzoate | Trinonyl-phenyl phosphite | 4.1 | 60.0 | 18.0 | 0.4 | 10.8 | 239 | 500 |
| 26 | 2.3 | 3.6 | | | | | (0.18) | | 800 |
| Comparative Example | | | | | | | | | |
| 10 | Ethyl benzoate | Phosphorus trichloride | 1.7 | 57.0 | 18.0 | 3.1 | 6.9 | 110 | 500 |
| 11 | 2.3 | 1.38 | | | | | (2.17) | | 800 |

TABLE 7B

| | White powdery polymer | | | | Solvent-soluble polymer (g) | Activity ($\frac{g - pp}{mmol - Ti}$) | I.I. (%) |
| --- | --- | --- | --- | --- | --- | --- | --- |
| | Yield (g) | n-Heptane extraction residue (%) | M.I. | Apparent density | | | |
| Example | | | | | | | |
| 17 | 235 | 95.6 | 3.5 | 0.32 | 5.9 | 10,700 | 93.3 |
| 18 | 241 | 95.4 | 10.2 | 0.32 | 6.8 | 11,000 | 92.8 |
| 19 | 243 | 95.1 | 4.0 | 0.34 | 5.0 | 11,000 | 93.2 |
| 20 | 250 | 94.9 | 11.3 | 0.35 | 5.9 | 11,400 | 92.7 |
| 21 | 259 | 95.8 | 2.9 | 0.36 | 6.1 | 11,800 | 93.6 |
| 22 | 262 | 95.4 | 9.7 | 0.35 | 6.9 | 12,000 | 93.0 |
| 23 | 264 | 95.8 | 3.2 | 0.36 | 6.7 | 12,000 | 93.4 |
| 24 | 248 | 95.5 | 13.2 | 0.36 | 7.2 | 11,300 | 92.8 |
| 25 | 246 | 95.5 | 3.4 | 0.33 | 6.3 | 11,200 | 93.1 |
| 26 | 246 | 95.1 | 10.0 | 0.32 | 7.2 | 11,300 | 92.4 |
| Comparative Example | | | | | | | |
| 10 | 215 | 95.4 | 4.4 | 0.30 | 6.6 | 9,800 | 92.6 |

TABLE 7B-continued

| | White powdery polymer | | | | Solvent- | | |
|---|---|---|---|---|---|---|---|
| | Yield (g) | n-Heptane extraction residue (%) | M.I. | Apparent density | soluble polymer (g) | Activity $\left(\dfrac{g - pp}{mmol - Ti}\right)$ | I.I. (%) |
| 11 | 204 | 92.3 | 34.0 | 0.31 | 8.6 | 9,400 | 88.6 |

COMPARATIVE EXAMPLES 12 AND 13

An experiment was conducted in accordance with Comparative Example 6 of Japanese Laid-Open Patent Publication No. 1276/78.

Specifically, 20 g of anhydrous magnesium chloride and 6 g of methyl benzoate were co-pulverized in a vibratory ball mill at room temperature for 8 hours. Then, 15 g of the co-pulverized product was added to a solution consisting of 125 ml of toluene, 50 ml of titanium tetrachloride and 49.5 g of triphenyl phosphate, and they were reacted at 65° C. for 2 hours with stirring. The reaction product was washed with toluene, and dried under reduced pressure to obtain a complex compound containing 1.8% by weight of titanium, 44.0% by weight of chlorine, 15.0% by weight of magnesium, 1.1% by weight of phosphorus and 8.4% by weight of methyl benzoate. The resulting complex compound had a specific surface area of 5.6 m²/g.

Propylene was polymerized in the same way as in Example 1 except that the amount of hydrogen was changed.

The results of polymerization are shown in Table 8.

TABLE 8

| Comparative Example | Amount of hydrogen added (ml) | White powdery polymer | | | | Solvent-soluble polymer (g) | Activity $\left(\dfrac{g - pp}{mmol - Ti}\right)$ | I.I. (%) |
|---|---|---|---|---|---|---|---|---|
| | | Yield (g) | n-Heptane extraction residue (%) | M.I. | Apparent density (g/ml) | | | |
| 12 | 500 | 154 | 93.8 | 3.3 | 0.21 | 6.2 | 7,100 | 90.2 |
| 13 | 800 | 138 | 91.2 | 15.3 | 0.19 | 7.4 | 6,500 | 86.6 |

What we claim is:

1. In a process for producing an olefin polymer or copolymer having a high degree of stereoregularity by polymerizing an alpha-olefin having at least 3 carbon atoms or copolymerizing such alpha-olefins with each other or such an alpha-olefin with up to 20 mole% of ethylene and/or a diene in the presence of a catalyst formed from (1) a solid titanium catalyst component and (2) an organoaluminum compound, at a temperature of about 20° to about 200° C. and a pressure of from atmospheric pressure to about 50 kg/cm², under the copresence of hydrogen as molecular weight controller, the improvement comprising using as said catalyst (A) the solid titanium catalyst component (1) containing magnesium, halogen, titanium, phosphorus and carboxylic acid ester wherein magnesium is derived from a magnesium compound selected from the group consisting of magnesium halides, magnesium alkoxyhalides, magnesium aryloxyhalides, magnesium alkoxides and magnesium aryloxides, and wherein said phosphorus is derived from a phosphorus compound selected from the group consisting of compounds of the following formulas:

$$PX_mR^1_n(OR^2)_q$$

and $$POX_rR^3_s(OR^4)_t$$

wherein X is a halogen atom, each of $R^1$, $R^2$, $R^3$ and $R^4$ is selected from hydrocarbon groups having 1 to 20 carbon atoms and the halogen-substituted derivatives thereof, and $R^1$ and $R^2$ are identical or different and $R^3$ and $R^4$ are identical or different, $m+n+q=3$, $0 \leq m \leq 3$, $0 \leq n \leq 3$, $0 \leq q \leq 3$, $r+s+t=3$, $0 \leq r \leq 3$, $0 \leq s \leq 3$, and $0 \leq t \leq 3$;

and said carboxylic acid ester being an ester having from 2 to 40 carbon atoms;

wherein the molar ratio of phosphorus to carboxylic acid ester is from 0.05 to 2, the molar ratio of the carboxylic acid ester to titanium is from about 0.2 to about 10, the molar ratio of the magnesium to titanium is from about 3 to about 40, and the molar ratio of the halogen to titanium is from about 4 to about 100; said component (1) having a specific surface area of not less than about 40 m²/g, said component (1) being prepared by intensively pulverizing the magnesium compound, the carboxylic acid ester and the phosphorus compound by mechanical means in the absence or presence of at least one member selected from the group consisting of titanium compounds, inert carriers and pulverization aids, and contacting the pulverized product with a tetravalent titanium compound which is in the liquid state under the treating conditions in the absence of mechanical pulverization:

(B) the organolauminum compound (2); and (C) an ester as an electron donor;

wherein (i) the proportion of component (C) in the polymerization or copolymerization is about 0.01 to about 1 mole per gram-atom of the aluminum atom in catalyst component (B) and (ii) the proportion of the aluminum atom in component (B) is about 1 to about 1000 moles per gram-atom of titanium in component (A) whereby the melt flow index of said olefin polymer or copolymer can be substantially varied without substantially decreasing the stereoregularity of said polymer or copolymer.

2. The process of claim 1 wherein at least 80% by weight of the titanium compound contained in said solid titanium catalyst component (A) is insoluble in boiling n-heptane.

3. The process of claim 1 wherein said solid titanium catalyst component (A) is further characterized by a magnesium/titanium mole ratio of from 5 to 30; a halogen/titanium mole ratio of from 10 to 90; a carboxylic acid ester/titanium mole ratio of from 0.4 to 6 and a phosphorus/carboxylic acid ester mole ratio of from 0.1 to 1, said solid titanium catalyst component having a specific surface area in the range of from about 100 to 500 m²/g.

4. The process of claim 3 wherein said solid titanium catalyst component (A) is characterized by an X-ray spectrum in which the diffraction line of the maximum intensity appearing in the spectrum of the corresponding magnesium halide exhibits a decreased relative intensity and appears asymmetrically broadened so as to form a halo in which the intensity peak is shifted with respect to the maximum intensity line, or the maximum intensity line is not present in the spectrum and a halo having an intensity peak shifted with respect to the distance of the maximum intensity line appears.

5. The process of claim 1 wherein said carboxylic acid ester is an aromatic carboxylic acid ester having from 8 to 18 carbon atoms; said organoaluminum compound (B) is selected from the group consisting of alkyl aluminums, alkyl aluminum alkoxides, alkyl aluminum phenoxides, and alkyl aluminum hydrides, wherein the alkyl and alkoxy groups have from 1 to 12 carbon atoms;

and said electron donor (C) is at least one member selected from the group consisting of methyl formate, methyl acetate, ethyl acetate, vinyl acetate, propyl acetate, octyl acetate, cyclohexyl acetate, ethyl propionate, methyl butyrate, ethyl valerate, octyl valerate, ethyl caprate, ethyl enanthoate, ethyl caprylate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, benzyl benzoate, methyl toluate, ethyl toluate, amyl toluate, ethylhexyl toluate, ethyl ethylbenzoate, methyl anisate, ethyl anisate, ethyl ethoxybenzoate, ethyl p-butoxybenzoate, ethyl o-chlorobenzoate, and ethyl naphthoate;

and the proportion of the electron donor (C) to the organoaluminum compound (B) is from about 0.01 to about 1 mole of (C) per aluminum atom of component (B).

6. A catalyst for producing an olefin polymer or copolymer by polymerizing a alpha-olefin having at least 3 carbon atoms or copolymerizing such alpha-olefins with each other or such an alpha-olefin with up to 20 mole% of ethylene and/or a diene in the presence of said catalyst, said catalyst comprising (A) a solid titanium catalyst component containing magnesium, halogen, titanium, phosphorus and a carboxylic acid ester wherein magnesium is derived from a magnesium compound selected from the group consisting of magnesium halides, magnesium alkoxyhalides, magnesium aryloxyhalides, magnesium alkoxides and magnesium aryloxides, said carboxylic acid ester has from 2 to 40 carbon atoms, and said phosphorus is derived from a phosphorus compound selected from the group consisting of the phosphorus compounds of the formulas $$PX_m R^1_n (OR^2)_q$$

and $$POX_r R^3_s (OR^4)_t$$

wherein X is a halogen atom, each of $R^1$, $R^2$, $R^3$ and $R^4$ is selected from hydrocarbon groups having 1 to 20 carbon atoms and the halogen-substituted derivatives thereof, and $R^1$ and $R^2$ are identical or different and $R^3$ and $R^4$ are identical or different, $m+n+q=3$, $0 \leq m \leq 3$, $0 \leq n \leq 3$, $0 \leq q \leq 3$, $r+s+t=3$, $0 \leq r \leq 3$, $0 \leq s \leq 3$, and $0 \leq t \leq 3$;

wherein the molar ratio of phosphorus to carboxylic acid ester is from 0.5 to 0.2, the molar ratio of the carboxylic acid ester to titanium is from about 0.2 to about 10, the molar ratio of the magnesium to titanium is from about 3 to about 40, and the molar ratio of the halogen to titanium is from about 4 to about 100; said solid titanium catlyst component having a specific surface area of not less than 40 m²/g and being prepared by intensively pulverizing the magnesium compound, the carboxylic acid ester and the phosphorus compound by mechanical means in the absence or presence of at least one member selected from the group consisting of titanium compounds, inert carriers and pulverization aids, and contacting the pulverized product with a titanium halide compound which is in the liquid state under the treating conditions in the absence of mechanical pulverization;

(B) an organoaluminum compound; and (C) an ester as electron donor;

wherein (i) the proportion of component (C) in the polymerization or copolymerization is about 0.01 to about 1 mole per gram-atom of the aluminum atom in catalyst component (B) and (ii) the proportion of the aluminum atom in component (B) is about 1 to about 1,000 moles per gram-atom of titanium in component (A);

said catalyst being capable of producing said olefin polymer or copolymer having a broad range of melt flow indices without substantially decreasing the stereoregularity of said polymer or copolymer.

* * * * *